Feb. 9, 1971 G. BALLIN Re. 27,057

COLLAPSIBLE TUBES WITH FOLLOWER AND THE METHOD OF FILLING THEREOF

Original Filed April 28, 1964 3 Sheets-Sheet 1

INVENTOR.
GENE BALLIN

BY Darby & Darby
ATTORNEYS

INVENTOR.
GENE BALLIN
BY
Darby & Darby
ATTORNEYS

INVENTOR.
GENE BALLIN

BY Darby & Darby
ATTORNEYS

United States Patent Office

Re. 27,057
Reissued Feb. 9, 1971

27,057

COLLAPSIBLE TUBES WITH FOLLOWER AND THE METHOD OF FILLING THEREOF

Gene Ballin, 3045 Shore Drive, Merrick, N.Y. 11566

Original No. 3,297,207, dated Jan. 10, 1967, Ser. No. 363,140, Apr. 28, 1964. Application for reissue Dec. 23, 1968, Ser. No. 799,133

Int. Cl. B65d *35/08*

U.S. Cl. 222—107 18 Claims

Matter enclosed in heavy brackets [ ] appears in the original patent but forms no part of this reissue specification; matter printed in italics indicates the additions made by reissue.

*ABSTRACT OF THE DISCLOSURE*

*A collapsible tube for dispensing a semi-fluid composition when the tube is squeezed has a follower slidably positioned within the tube. The follower has a body portion which compresses the semi-fluid composition when pressure is applied to the tube and a skirt which cooperates with the interior wall of the tube to retain the follower in coaxial alignment with the tube.*

*In a process for filling the collapsible tube, a flexible tapered member is inserted into the tube which is already filled with a predetermined amount of the composition and a follower is introduced into the tapered member thereby expanding the tube as the follower enters.*

This invention relates to improvements in flexible, collapsible tubes for dispensing semi-fluid compositions when the tubes are squeezed and a process for filling said tubes, and more particularly relates to means for increasing the efficiency of such collapsible dispensing tubes.

Flexible, collapsible tubes are commonly used for dispensing an endless variety of semi-fluid compositions, such as toothpaste, shaving cream, jellies, ointments, salves, greases, oil colors, and the like. Such dispensers are made of metallic foils and plastic compositions of light gauge, so that the wall of the tube will deform, flex, or bend when squeezed between the fingers and extrude a portion of the contents of the tube. It has heretofore been virtually impossible to dispense the entire contents of such collapsible tubes. Further, no practical means has been provided for extruding an exact or measured quantity of the contents of such tubes. Additionally, metal tubes wrinkle during use and tear easily so that pressure exerted on the tube expels the contents of the tube through the tear instead of through the mouth of the tube, thereby preventing resealing of the contents and creating a messy problem with every use thereafter.

It is an object of this invention to provide a follower or plunger internally positioned within a collapsible dispensing tube to reduce the waste incident to the extrusion of the semi-fluid composition contained within the collapsible dispensing tubes by wiping the interior surfaces of the tube during the extrusion process.

Another object of the present invention is to provide a collapsible tube capable of dispensing an exact and measured quantity of a semi-fluid composition.

A further object of this invention is to provide an easy to make, one-piece plunger contained within a collapsible plastic dispensing tube, and movable in response to flexing of the container to force the contents out in a controlled manner and to insure that no part of the contents of the collapsible tube is sucked behind the plunger.

A still further object of the present invention is to prevent the entrance or suck-back of air into the dispensing tube during re-expansion thereof.

A further object is to provide a method of positively filling a collapsible tube and introducing the plunger in an easy, facile manner.

The above and other objects together with features and advantages of the present invention will appear more fully from the following description and drawing, wherein.

Figure 1:
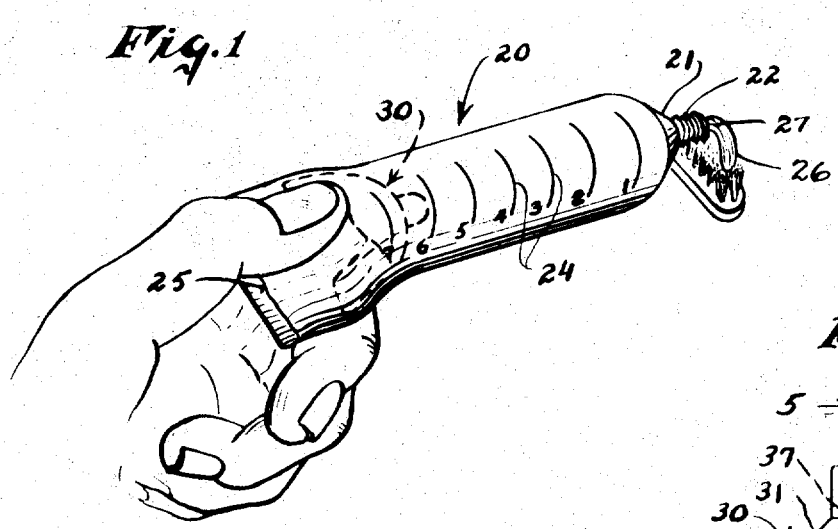
FIGURE 1 is a perspective view of one form of the present invention, applied by way of illustration only, to the extrusion of toothpaste.

A collapsible container 20 shown in FIGURE 1 is tubular in shape and is preferably fabricated from any conventional plastic foil of suitable gauge, or of a translucent or a transparent plastic composition. A collapsible container made of a plastic composition which is flexible, resilient and transparent, is peculiarly adapted to the extrusion of an exact or measured amount of the contents 26 of tube 20.

Figure 7:
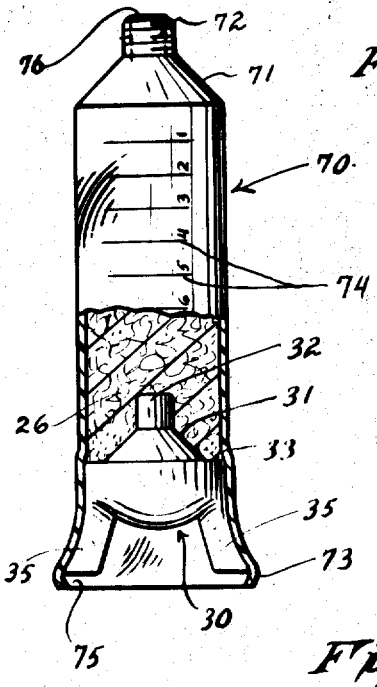
FIGURE 7 is cross-sectional view of another embodiment of the present invention.

Tube 20, as illustrated, has formed a conical neck portion 21 at its top, ending in a conventional male threaded hollow extrusion nipple 22 to receive a female threaded screw cap (not shown). Tube 20 may be provided with a visible scale 24 along its longitudinal surface and graduated to indicate any system of measure, as of capacity expressed in fluid ounces, cubic centimeters, etc., and subfractions thereof. Any semi-fluid composition 26 may be extruded through orifice 27 in nipple 22. Collapsible tube 20 is made longer than a conventional collapsible tube of the same capacity, in order to accommodate a follower 30. After follower 30 has been inserted inside tube 20, discussed hereinafter, the filling end thereof may be either closed, as by sealing at 25 (FIG. 1) in the conventional way, or left open as illustrated in FIGURE 7.

Follower 30 is sized to telescopically fit within the dispensing tube 20 with a sliding fit, so that when the extrusion nipple 22 is uncapped, said follower may be advanced in the tube 20, to extrude a measured quantity of the semi-fluid contents 26 of the dispenser through orifice 27 in said uncapped extrusion nipple 22.

Figure 2:
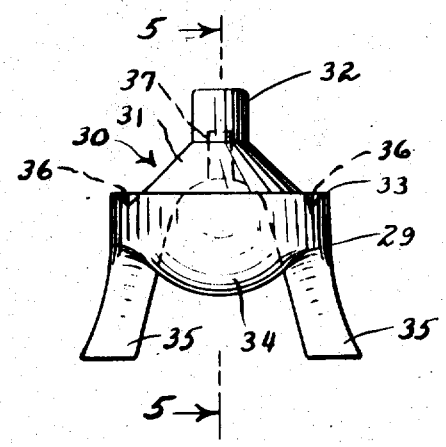
FIGURE 2 is a side elevational view of one form of a follower in accordance with the present invention for use in association with a collapsible tube.
Figure 4:
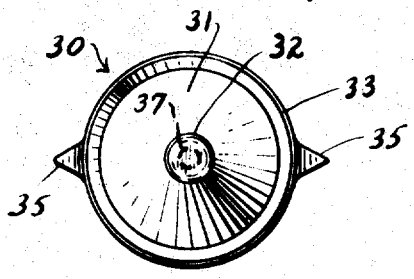
FIGURE 4 is a plan view of the top thereof.
Figure 3:
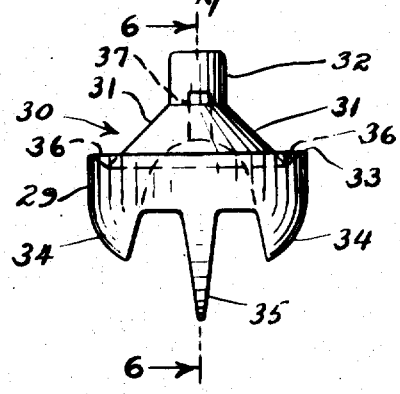
FIGURE 3 is a front elevational view of this follower.
Figure 5:
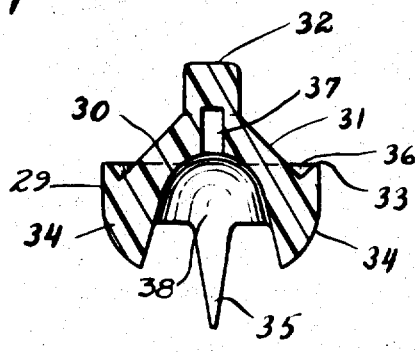
FIGURE 5 is a cross-sectional view of the follower, taken along the line 5—5 of FIGURE 2.
Figure 6:
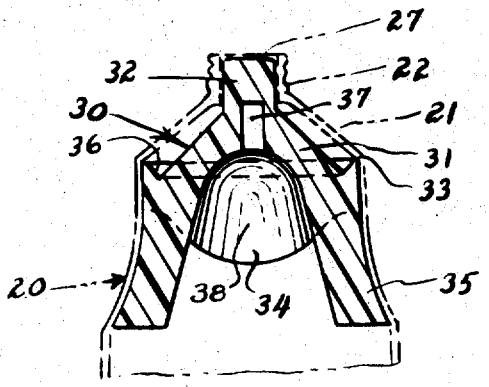
FIGURE 6 is a cross-sectional view of the follower, taken along the line 6—6 of FIGURE 3, and showing a fragment of a dispenser in phantom.

As seen best in FIGURES 2, 3 and 6, follower 30 includes a conical neck portion 31 shaped and sized to nest inside the substantially conical neck 21 of the collapsible tube 20 and a boss or cyclindrical projection 32 sized to register in orifice 27 in the nipple 22. Disposed about the peripheral surface of follower 30 is a generally cylindrical skirt portion 29. Extending upwardly from skirt portion 29 is an upstanding peripheral flange or feathered lip 33 sized to snugly engage the interior surface of the cylindrical wall of dispensing tube 20 with a sliding fit to effect a squeegee-like action upon the composition 26 clinging to the interior surfaces of tube 20. Depending rearwardly from skirt 29 are skirt extensions 34, 34 and arms or spurs 35, 35. Extensions 34, 34 are positioned between the rearwardly diverging arms or spurs 35, 35. The outer peripheral surfaces of skirt 29 and extensions 34, 34 and spurs 35, 35 are substantially equal to the outer peripheral surface of flange 33 and form a cylindrical surface. The ends of spurs 35, 35 flare outwardly beyond the diameter of said cylindrical surfaces as seen best in FIGURES 2, 4 and 6. The inner wall of flange 33 is downwardly and inwardly tapered and intersects conical neck portion 31 in a peripheral V-shaped channel 36.

Skirt portion 29 and the bottom portion of conical neck portion 31 define an interior volume 38. Communicating with volume 38 is a central opening or socket 37 formed within and coaxial with conical neck 31. Socket 37 is provided to cooperate with a guide rod (not shown) used for inserting follower 30 in dispensing tube 20 after filling the tube with the paste or composition 26, in a manner described hereafter.

By squeezing or pinching uncapped tube 20 between the thumb and forefinger and behind the follower 30, substantially as shown in FIGURE 1, the wall of tube 20 is compressed, which applies pressure to skirt 29 of the follower 30, thus urging follower 30 forward, toward neck 21 of tube 20, to compress the column of the semi-fluid 26 within tube 20 and extrude a desired portion thereof through orifice 27 in nipple 22. The upstanding peripheral flange 33 engages the interior faces of the wall of the tube 20 with a feathering action to wipe or squeegee composition 26 from the interior face of the tube into V-shaped channel 36 formed between the face of the inwardly and rearwardly inclined wall of the flange 33 and the rearwardly and outwardly inclined face of the conical neck 31. The spaced skirt extensions 34, 34 of skirt 29 and the diverging arms or spurs 35, 35 cooperate with the interior face of the tube 20 to maintain follower 30 in coaxial alignment with the axis of the tube 20. The arms or spurs 35, 35 engage the interior surfaces of the tube 20 to prevent retrogression of the follower 30 in tube 20. Use of follower 30 allows extrusion of the entire quantity of composition 26 introduced into tube 20.

Scale 24 may be calibrated in any preferred systems of measure, such as fluid ounces and fractions thereof. To measure out any desired amount of composition 26, the scale reading should be initially noted, and then composition 26 should be extruded in the manner described above, while observing changes in the scale reading until the new scale reading indicates that the exact amount desired has been dispensed through the orifice 27. For exact measure, it is essential that no composition 26 is sucked behind follower 30 during the extrusion process.

Tube 20 may be made of any conventional type of pliable, flexible, collapsible, resilient tubular plastic stock, which is compressibly responsive to finger pressure, such as polyethylene, cellulose acetate, vinyl resin, polyvinyl chloride. The followers of this invention may be fabricated from plastic material suitable for use with the products to be dispensed. Followers made of polypropylene or of polyethylene give good results.

Figure 9:
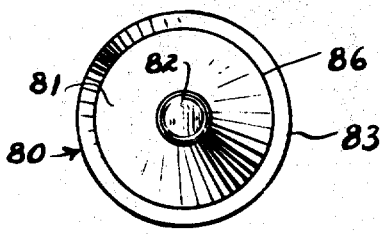
FIGURE 9 is a plan view of the top of the said embodiment shown in FIGURE 8.
Figure 8:
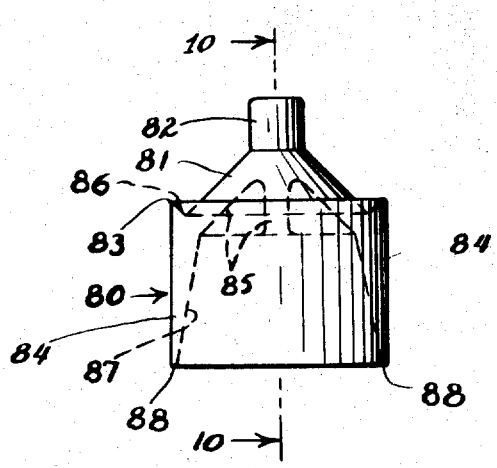
FIGURE 8 is a side elevational view of another embodiment of a follower.
Figure 10:
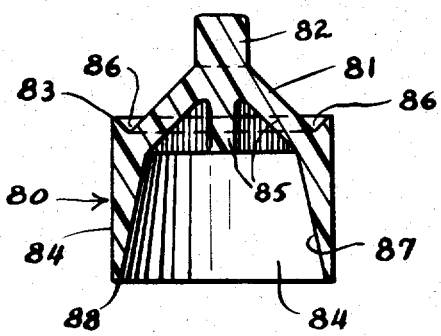
FIGURE 10 is a cross-sectional view of the said embodiment of the follower taken along the line 10—10 of FIGURE 8.

Follower 30 may be modified as seen in FIGURES 8, 9 and 10. Follower 80 has a conical neck 81 which merges with a boss or nose 82. The upstanding, self-supporting flange 83 encircles the base of neck 81, and continues rearwardly to merge with and form a cylindrical skirt 84. Plunger 80 is hollow and neck 81 is reinforced by a series of interior ribs 85, which are preferably molded integral with the neck and which underlie the same. Upstanding flange 83 and the sloping neck 81 in conjunction define a circular V-shaped channel 86. The outer face of skirt 84 is cylindrical, and the inner face 87 of the wall of the skirt 84 is frusto-conical and tapers to a thin edge 88. Squeezing collapsible tube 20 between thumb and finger, substantially as shown in FIGURE 1, transmits the pressure from the wall of tube 20 toward the rear of follower 80. The tapered wall of skirt 84 yields and urges the follower 80 forward to displace and extrude the semi-fluid contents of the tube 20 through the orifice 27 in the nipple 22. Flange 83 engages the inner surface of tube 20 and wipes the surface clean of composition 26.

Figure 11:
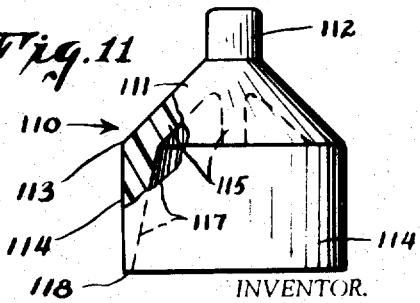
FIGURE 11 is a cross-sectional side elevational view of another modified form of a follower.

A further modified form of the present invention is shown in FIGURE 11, where a follower 110 has a conical shaped neck 111, the base whereof merges at 113 with a cylindrical skirt 114 and the top whereof merges with a boss 112. Neck 111 is reinforced by a series of internal webs 115. Skirt 114 has an inner surface 117, which is frusto-conical tapering to a thin edge face 118. Skirt 114 which engages the inner wall of its dispensing tube 20 with a sliding fit, omits the peripheral flange shown at 83 in FIGURES 8–10.

A modified form of a dispensing tube is shown in FIGURE 7 and designated as 70 and is open at the back end of the plastic resilient tube at 75, so that when the tube 70 is manually compressed between spurs 35 of follower 30, the open end 75 of the tube is elongated crosswise at 73 to conform to the fish-tail configuration of the diverging arms 35, 35 of the follower 30. Follower 30 advances along the tube 70 when the tube is compressed to extrude the paste or composition 26 through the orifice 76 in nipple 72 in a manner similar to that described above. A scale 74 is illustrated on the outer longitudinal length of tube 70. As illustrated, the outer diameter of follower 30 is slightly larger than the inner diameter of tube 70, so that tube 70 is resiliently expanded by passage of follower 30 to provide a good seal and a positive wiping action by flange 33. The open end 75 of resilient tube 70 turns inwardly at 73 behind the outward flare of diverging arms 35, 35, to arrest any retrograde movement of follower 30. As the end 75 is always open, the seal between the peripheral flange 33 of follower 30 and the cylindrical wall of tube 70 is not subjected to suck-back of either air or of paste during compression or re-expansion of dispensing tube 70.

When the dispensing tube is composed of a transparent or of a suitably translucent, plastic composition, the attained level of the semi-fluid composition 26 is readily visible through the wall of the tube, and said attained level, and every change therein, can be read off upon the graduated scales 24 and 74; the difference in said readings indicating the exact quantity of said composition 26 dispensed from the tube.

Figure 12:
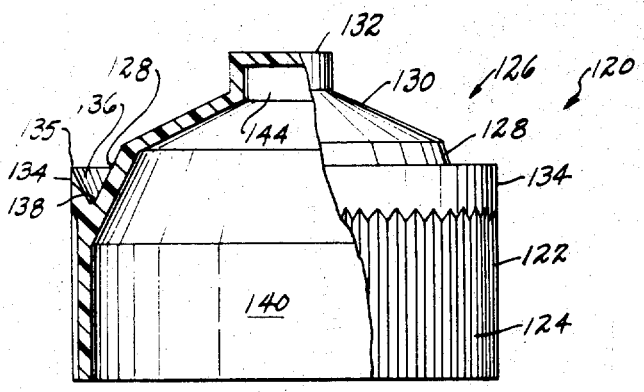
FIGURE 12 is a side-elevational view, partly in section, of a further embodiment of a follower.

A still further embodiment is a follower as shown in FIGURE 12. Here, follower 120 is shown having a generally thin-walled, tubular surface 122. The outer face of wall 122 has a series of longitudinally directed knurls or striations therein, extending a portion of the length of wall 122 from the bottom edge. Enclosing one end of cylindrical surface 122 is a generally conical neck 126. As shown, neck 126 is formed of two inwardly tapered portions 128 and 130 with portion 128 of neck 126 integrally joining the upper inner edge of wall 122. Integrally joined to the upper edge of portion 130 of neck 126 is an outwardly extending boss 132, which is coaxial to the axis of wall 122. Circumferentially disposed about the upper edge of wall 122 is a self-supporting upwardly extending flange 134. Flange 134 has a downwardly and inwardly directed tapered inner surface 136, which intersects with the outer surface of portion 128 of neck 126 to form and define a V-shaped channel 138. Wall 132 and neck portion 126 define an interior volume 140 therein. Volume 140 communicates with the interior of boss 132 indicated at 144. Flange 134 has a feathered edge 135 formed by the downwardly and inwardly taper of the inner wall 136.

Follower 120 is used and operates in a manner described above with the other embodiments.

Figure 13:
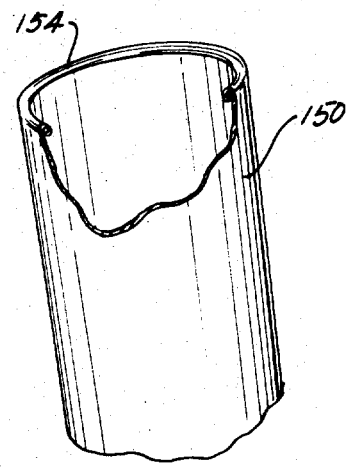
FIGURE 13 is a side perspective view of the rear end of a collapsible tube.
Figure 14:
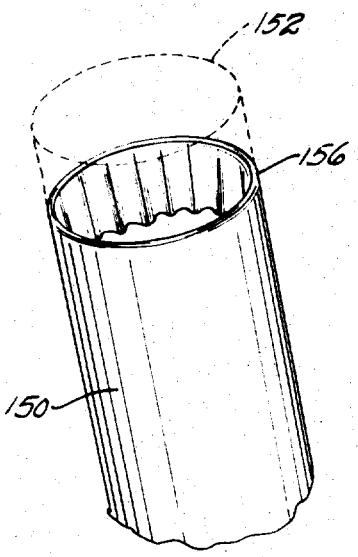
FIGURE 14 is a side perspective view of the rear end of another tube.
Figure 15:
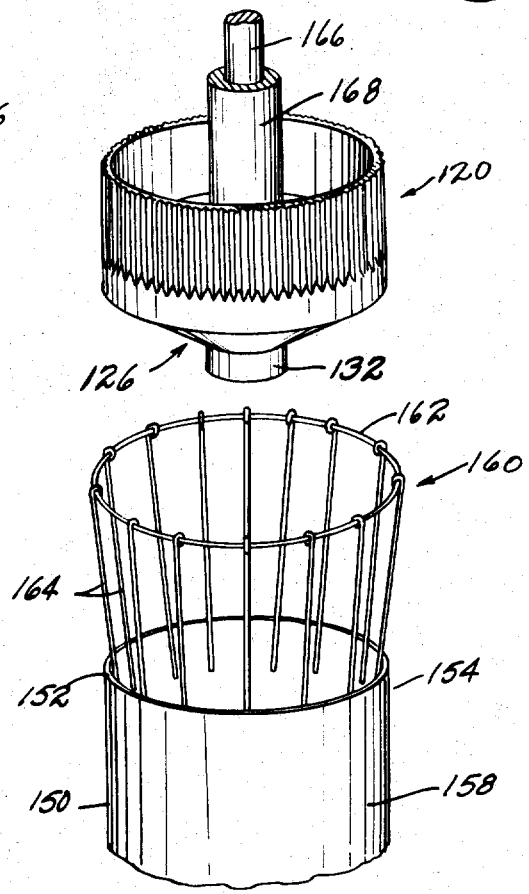
FIGURE 15 is an exploded view of a filled tube broken away, showing a follower ready to be inserted.

FIGURES 13, 14 and 15 show a method of introducing a follower illustratively shown as follower 120, into tube 150.

As shown in either FIGURES 13 or 14, the open end of tube 150 may be folded inwardly in some manner to form a constriction of some type, such as curling, as shown in FIGURE 13, or crimping as shown in FIGURE 14. In FIGURE 13 the open end of tube 150 is curled or rolled inwardly and heat-sealed to present an inner obstruction to the outward sliding of follower 120 and prevent retrogression of the follower 120. In FIGURE 14 the open end 152 of tube 150 is folded inwardly and heat or ultrasonically sealed and then crimped as shown in 156 to present an obstruction to the outward sliding of follower 120. Once follower 120 is inserted into tube 150, the end of tube 150 can be sealed or closed in a conventional manner or left open as shown in the construction of FIGURE 7.

As shown in FIGURE 15, follower 120 can be easily inserted into tube 150. Tube 150 is initially filled to a desired level with the intended composition indicated as 158. A tapered surface or sleeve 160 is shown having its smaller diameter end inserted into open end 154 of tube 152. As shown, tapered surface 160 has a ring 162 which is attached to a series of spaced apart wires, rods, or tongues 164. The free ends of wires 164 extend partly into the open end 154 of tube 152. Wires 164 can be fixedly or pivotally joined to ring 162. Follower 120 with its neck 126 leading, is introduced into tapered ring 160. A guide or push rod 166 is received into opening 144 in the interior or boss 132 of follower 120. Guide rod 166 forces follower 120 downwardly into the tapered opening formed by wires 164 and urged forward into tube 150. Wires or tongues 164 evenly stretch the open end of tube 150 as the follower is forced downwardly by rod 166. Wires 164 and knurls 124 permit the escape of air around follower 122 as the follower is forced into the tube. When follower 122 reaches its desired position within tube 150, the tapered ring 160 is withdrawn and follower pusher rod or plunger 166 is withdrawn in an easy manner by freeing collar 168, which is of a larger diameter than the opening 144 exerting a downward force on the interior of neck portion 130 of follower 120, as push rod 166 is withdrawn. With follower 120 in the desired position within tube 150, the obstructions formed on the end of tube 150, such as shown in FIGURES 13 and 14, prevent follower 120 from retrogression. The open end 154 of tube 150 is then sealed in any conventional manner and the tube is ready to be used in the mainer shown in FIGURE 1.

Other loading devices than the tapered ring may be used which could be funnels, or tapered surfaces.

While follower 120 was shown being inserted into tube 150, other embodiments of the follower could be introduced in the same manner.

While the closed ends of the tubes illustratively used and described in the above description were shown having threaded nipples, a dispensing opening could be used with small flanges around the opening, so that a cap or closure covers the entire top area of the container, all of which is well-known in the art.

From the above it is understood that the present construction provides positive ejection of the material contained within the tube in a precise or measured amount, as well as removing substantially all of the material contained within the tube. Changes may be made to the illustrative constructions described above without departing from the spirit and purpose of this invention.

It will be understood that the invention has been described for the purposes of illustration and that changes and variations are possible without departing from the scope of the invention; all such modifications and changes are intended to be included in the appended claim.

What is claimed is:

1. In combination a resilient, deformable plastic tube having a discharge opening at one end thereof and adapted to house material to be extruded through said opening, a follower positioned within said container for extruding material housed therein through said discharge opening, said follower having a body portion slidably fitted to the interior wall of said container, said body portion having an end facing said discharge opening, an upstanding peripheral edge projecting forwardly from said end of said follower facing the discharge opening to define a tapered squeegee edge slidably fitted to the interior of said container to remove material from the wall therefrom as the follower is moved forwardly in the container, said squeegee edge having a shape complementary to the interior wall of the container and being slightly larger than said interior wall to form a pressure seal to prevent the tube contents from passing back of the follower when pressure is exerted on the resilient, deformable plastic tube, the opposite end of said follower terminating in a resilient skirt which extends a substantial distance rearwardly of the squeegee edge to keep the follower aligned in the tube when pressure is applied thereto to maintain the seal at the squeegee edge, said follower being slidable coaxially within the tube toward said discharge opening responsive to pressure exerted on the wall of said tube.

2. The combination of claim 1 wherein said rearwardly projecting skirt is of a resilient material and is also continuous and is larger in size than the interior wall of the tube to further enhance the pressure seal and the follower alignment.

3. The combination of claim 2 wherein said skirt is formed with a plurality of striations to reduce the sliding friction of the follower as it moves in the tube.

4. The combination of claim 1 wherein said squeegee edge is also formed of a resilient material, the body of the follower formed with a channel complementary to and communicating with the squeegee edge, the material in the tube filling said channel and acting on said squeegee edge to urge it outwardly against the resilient tube wall.

5. The combination of claim 1 wherein the tube is sufficiently translucent to render the follower and the contents of the tube visible, said tube being calibrated for measured quantities of material extrudable therefrom by said follower, and a scale legibly recorded upon the wall of said tube to indicated the correct position of said follower relative to the tube after extrusion of each of the measured quantities of material.

6. The combination defined in claim 1 wherein the container is made from plastic tubing which is sufficiently translucent to render the follower and the contents of the container visible through said tubing, said container being calibrated for measured quantities of material extrudable therefrom by said follower, and a scale legibly recorded upon the wall of said container to indicate the correct position of said follower relative to the container after extrusion of each measured quantity of material.

7. The combination defined in claim 1 wherein said follower body has a push rod receiving opening in the end of said follower away from said discharge opening.

8. A collapsible container for housing and dispensing paste-like compositions comprising a pliable, resilient, collapsible tube, said tube having two oppositely disposed ends, one of said ends being sealed closed and constituting the rear end of said tube, the opposite end of said tube being tapered to form a conical neck defining the front end of said tube, the portion of said tube intermediate said oppositely disposed ends being cylindrical, a dispensing opening in said conical neck and extending coaxial therewith and with the cylindrical portion of said tube, a follower movable within said tube and positioned between said composition and said rear end of said tube, said follower having a cone-shaped nose section, a tail section, and a mid-section integral with said nose and said tail sections, said nose section terminating in forwardly projecting protuberance sized to nest within said dispensing opening, said tail section comprising skirt portions and wing portions interposed between said skirt portions, said skirt portions extending rearwardly and said wing portions extending rearwardly and flaring outwardly from said mid-section, said mid-section having a peripheral flange projecting forwardly from said mid-section, said flange tapering to a feather edge circumscribing said mid-section, said mid-section and its peripheral flange being coaxial with each other and with said dispensing opening of said tube, said mid-section of said follower being sized to engage the interior face of the cylindrical portion of the wall of said dispensing tube with a sliding fit and to cause said feather-edged flange to squeegee any of the paste-like composition adhering to the interior face of said tube on to the cone-shaped nose section of said follower for advancement toward said dispensing opening, the wall of said tube behind said tail section of said follower being progressively collapsible to elongate the wall of the tube crosswise to allow free passage of said wing sections while simultaneously enabling the skirt portions of said tail section to propel said follower forwards toward said dispensing opening until the cone-shaped nose of said follower nests against the conical neck of said tube and the forwardly projecting protuberance of said nose section occupies said dispensing opening, said wing portions of said tail section co-acting with the wall of the tube to prevent any return movement of said follower, said cone-shaped nose section co-acting with the conical neck of the dispensing tube to arrest forward progress of said follower and to advance any remaining paste-like composition into said dispensing opening, and said forwardly projecting protuberances co-acting with said dispensing opening to extrude the paste-like composition so advanced through said dispensing opening.

9. A process for filling plastic containers having an open end and a closed end, comprising sealing one end of a plastic tube containing a dispensing opening, filling a predetermined length of said tube with a semi-fluid substance through the open end, introducing the smaller diameter end of a flexible, tapered surface into said open end of said tube, introducing a follower of slightly larger diameter than the diameter of said tube into the tapered surface, forcing the follower through the tapered surface and into the tube, said tapered surface expanding said tube as said follower enters, withdrawing said tapered surface from said tube open end, and sealing said tube open end.

10. A process for filling plastic containers having an open end and a closed end, comprising sealing one end of a plastic tube containing a dispensing opening, filling a predetermined length of said tube with a semi-fluid substance through the open end, introducing the smaller diameter end of a flexible, tapered surface into said open end of said tube, introducing a follower of slightly larger diameter than the diameter of said tube into the tapered surface, forcing the follower through the tapered surface and into the tube, said tapered surface expanding said tube as said follower enters, and withdrawing said tapered surface from said tube open end.

*11. In combination a resilient, deformable tubular container having a discharge opening at one end thereof and adapted to house material to be extruded through said opening, and a follower positioned within said container for extruding material housed therein through said discharge opening, said follower having a body portion slidably fitted to the interior wall of said container, said body portion having an end facing said discharge opening, and the opposite end of said follower terminating in a resilient skirt which extends a substantial distance rearwardly of the body portion to keep the follower aligned in the container, said follower being slidable coaxially within the container toward said discharge opening responsive to transverse pressure exerted on the end portion of said skirt through the wall of said container, said skirt including means for reducing the sliding friction of the follower as it moves in the container.*

*12. The process of extruding material from a resilient, deformable tubular container having a discharge opening at one end thereof and adapted to house extrudible material, and having a movable follower positioned within said container for retaining said material housed in said tube, said follower having a body portion slidably fitted to the interior wall of said container, said body portion having an end facing said discharge opening and a peripheral edge projecting forwardly from said end of said follower facing the discharge opening to define a tapered squeegee edge slidably fitted to the interior of said container to remove material from the wall therefrom as the follower is moved forwardly in the container, said squeegee edge having a shape complementary to the interior wall of the container, the opposite end of said follower terminating in a resilient skirt which extends a substantial distance rearwardly of the squeegee edge, said process comprising the steps of applying pressure transversely through said tubular container to opposite sides of the end portion of said skirt opposite said discharge opening to slide said follower coaxially within said tubular container toward said opening for ejecting said material through said opening, and simultaneously maintaining said follower aligned in said tubular container.*

*13. In combination a resilient, deformable tube having a discharge opening at one end thereof and adapted to house material to be extruded through said opening upon transversely inward deformation of wall portions thereof, and a follower positioned within said tube for extruding material housed therein through said discharge opening, said follower having a body portion slidably fitted to the interior wall of said container, said body portion having an end facing said discharge opening, and upstanding peripheral edge projecting forwardly from said end of said follower facing the discharge opening to define a tapered squeegee edge slidably fitted to the interior of said tube to remove material from the wall therefrom as the follower is moved forwardly in the tube, said squeegee edge having a shape complementary to the interior wall of the tube and being slightly larger than said interior wall to form a pressure seal to prevent the tube contents from passing back of the follower when pressure is exerted on the resilient, deformable plastic tube, and means for slidably propelling said follower coaxially forward in said tube toward said discharge opening in response to transversely inward deformation of said tube wall portions at the rearward end of said follower, said means comprising a resilient skirt on said follower extending a substantial distance rearwardly of the squeegee edge and keeping the follower aligned in the tube to maintain the seal at the squeegee edge.*

*14. The combination defined in claim 13, wherein said skirt includes a plurality of longitudinally extending spaced bearing surfaces.*

*15. A process for filling deformable tubular containers having an open end and a closed end, comprising filling a predetermined length of said tube with an extrudible substance through the open end, introducing the smaller diameter end of a flexible tapered hollow insertion device into said open end of said tube, introducing a follower of slightly larger diameter than the diameter of said tube into the tapered device, forcing the follower through the tapered device and into the tube, said tapered device expanding said tube as said follower enters, and withdrawing said tapered device from said tube open end.*

*16. The process defined in claim 10, further comprising the step of permitting air initially disposed in said tube between said substance and the follower to escape past the follower during forced insertion of said follower.*

*17. The process defined in claim 16, wherein said step of permitting air to escape includes permitting said air*

*to bypass said follower through at least one passage defined by said device.*

*18. A process as in claim 9 wherein said step of introducing the smaller diameter end of a flexible, tapered surface into said open end of said tube includes introducing the smaller diameter end of a flexible, tapered surface formed of a plurality of elongated flexible members having a frusto-conical arrangement into said open end of said tube.*

References Cited

The following references, cited by the Examiner, are of record in the patented file of this patent or the original patent.

UNITED STATES PATENTS

| | | | |
|---|---|---|---|
| 2,361,647 | 10/1944 | Nyden | 222—386X |
| 3,184,120 | 5/1965 | Undi | 222—389X |
| 3,201,003 | 8/1965 | Wark et al. | 222—389X |
| 1,265,537 | 5/1918 | Shull | 222—158 |
| 2,809,774 | 10/1957 | Kaye et al. | 222—387X |
| 2,853,209 | 9/1958 | McArdle | 222—386X |
| 2,898,007 | 8/1959 | Gassaway | 222—387X |

ROBERT B. REEVES, Primary Examiner

N. L. STACK, Assistant Examiner